(12) United States Patent
Yoshida et al.

(10) Patent No.: US 11,740,895 B2
(45) Date of Patent: Aug. 29, 2023

(54) GENERATION OF SOFTWARE PROGRAM REPAIR EXPLANATIONS

(71) Applicant: FUJITSU LIMITED, Kawasaki (JP)

(72) Inventors: Hiroaki Yoshida, Cupertino, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 17/219,658

(22) Filed: Mar. 31, 2021

(65) Prior Publication Data
US 2022/0318005 A1    Oct. 6, 2022

(51) Int. Cl.
*G06F 40/186*   (2020.01)
*G06F 8/73*     (2018.01)
*G06F 40/40*    (2020.01)
*G06F 40/211*   (2020.01)

(52) U.S. Cl.
CPC .............. *G06F 8/73* (2013.01); *G06F 40/186* (2020.01); *G06F 40/211* (2020.01); *G06F 40/40* (2020.01)

(58) Field of Classification Search
CPC ........ G06F 8/73; G06F 40/186; G06F 40/211; G06F 40/04
See application file for complete search history.

(56) References Cited

U.S. PATENT DOCUMENTS

| | | | | |
|---|---|---|---|---|
| 9,448,769 B1* | 9/2016 | Katoch | ............... | G06F 11/3668 |
| 10,180,836 B1* | 1/2019 | Arguelles | .................. | G06F 8/75 |
| 2001/0056441 A1* | 12/2001 | Ehrman | .................... | G06F 8/71 |
| | | | | 715/234 |
| 2009/0210861 A1* | 8/2009 | Alupului | .................. | G06F 8/73 |
| | | | | 717/123 |
| 2013/0074038 A1* | 3/2013 | Fox | .......................... | G06F 8/71 |
| | | | | 717/122 |
| 2015/0363294 A1* | 12/2015 | Carback, III | ............. | G06F 8/70 |
| | | | | 717/132 |
| 2016/0306627 A1* | 10/2016 | Hewitt | ...................... | G06F 8/73 |
| 2017/0075790 A1* | 3/2017 | Macleod | ............. | G06F 11/3668 |
| 2018/0052663 A1* | 2/2018 | Castelli | ............... | G06F 11/3604 |
| 2019/0129701 A1* | 5/2019 | Hawrylo | ................... | G06F 8/60 |
| 2019/0129712 A1* | 5/2019 | Hawrylo | ................... | G06F 8/20 |
| 2019/0220253 A1* | 7/2019 | Pradhan | ................... | G06N 3/08 |
| 2021/0049008 A1* | 2/2021 | Zhang | ...................... | G06F 8/75 |

(Continued)

OTHER PUBLICATIONS

G. Sridhara, et al., "Towards Automatically Generating Summary Comments for Java Methods," ASE '10, Sep. 20, 2010.

(Continued)

*Primary Examiner* — Hassan Mrabi
(74) *Attorney, Agent, or Firm* — Maschoff Brennan (57) ABSTRACT

Operations may include obtaining a repair related to correcting an error of source code of a software program, the repair including an edit to make to the source code. The operations may further include determining a change type of the edit. The operations may additionally include identifying an explanation template from a library of explanation templates based on the change type corresponding to the explanation template in the library of explanation templates. In addition, the operations may include generating a change explanation for the edit based on the explanation template. The change explanation may provide a natural language explanation of the changes made by the edit.

20 Claims, 8 Drawing Sheets

(56) References Cited

U.S. PATENT DOCUMENTS

2021/0081182 A1* 3/2021 Seshadri .................. G06F 8/73
2021/0311729 A1* 10/2021 Gupta .................... G06N 3/084

OTHER PUBLICATIONS

R.P.L. Buse and W. Weimer, "Automatically Documenting Program Changes," ASE '10, Sep. 21, 2010.
A.T.T. Ying and M.P. Robillard, "Code Fragment Summarization," FSE '13, Aug. 2013.

* cited by examiner

FIG. 1A

| Change Type | Explanation |
|---|---|
| - method1(P, Q)<br>+ method2(P, Q) | Use method2 instead of method1 |
| - method1(P, Q)<br>+ method1(P, Q) | Add an extra parameter R for method1 invocation |
| - Type var<br>+ Type var = ...; | Restore the original variable var |
| + if (V ...) return X; | Insert a guard clause that checks V (e.g. first argument, iterator, etc.) |
| - if (cond1)<br>+ if (cond2) | Change the condition |
| - for (X : Y)<br>+ for (U : V) | Iterate over V instead of Y |
| - statement | Remove [if\|for\|while] statement |
| - expression1<br>+ expression2 | Replace the expression X with Y |

FIG. 1B

```
1  -   for (long segId : segs.keySet()) {
2  +   for (Map.Entry<Long, JournalSeq<E>> entry : segs/entrySet()) {
3  +     Long segId = entry.getKey();
4        Map.Entry<Long,JournalSeg<E>> prevEntry = segs.floorEntry(sedId-1);
5        if (!prevEntry != null) {
6          JournalSeg<E> prev = prevEntry.getValue();
7  
8  -       if (prev.lastIndex() != segs.get(segId).index() - 1) {
9  +       if (prev.lastIndex() != entry.getValue().index() - 1) {
10 -         log.warn("Found misaligned seg {}", segs.get(segId));
11 -         log.warn("Found misaligned seg {}", entry.getValue());
12         segs.remove(segId);
```

GENERATION OF SOFTWARE PROGRAM REPAIR EXPLANATIONS

FIELD

The embodiments discussed in the present disclosure are related to generation of software program repair explanations.

BACKGROUND

Software programs often have errors in them (commonly referred to as "bugs") in which they may not operate as intended. Often automated repair systems are used in attempt to identify errors in software programs. Additionally or alternatively, automated repair systems may provide recommended repairs for identified errors.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to one or more embodiments, operations may include obtaining a repair related to correcting an error of source code of a software program, the repair including an edit to make to the source code. The operations may further include determining a change type of the edit. The operations may additionally include identifying an explanation template from a library of explanation templates based on the change type corresponding to the explanation template in the library of explanation templates. In addition, the operations may include generating a change explanation for the edit based on the explanation template. The change explanation may provide a natural language explanation of the changes made by the edit.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Software programs often include errors (also commonly referred to as "bugs") that may cause the software programs to behave in an unintended manner. Additionally, automated repair systems and techniques are often used to detect errors in software programs and provide suggested edits to make to the software programs as repairs (also commonly referred to as "patches") of the errors.

However, the provided repairs are often given with little to no explanation as to what the repairs are or what they are accomplishing. For example, in some instances, a provided repair may include the source code that may be implemented to repair the error. However, the edits made to the software program as part of the repair may only be indicated without any explanation as to what they are doing. In these or other instances, a naive explanation may be included, which may merely provide a list of edits that are made as part of the repair.

According to one or more embodiments of the present disclosure, systems and methods may generate and provide explanations for software program repairs. The explanations provide more than just a list of edits and may allow users to better understand the nature of the repairs.

According to one or more embodiments of the present disclosure, the technological field of software development may be improved by configuring a computing system to provide automated explanations for provided repairs. In particular, the operations performed may provide the computing system with a mechanism to analyze the repairs and automatically form the explanations to provide more meaningful explanations than mere lists of edits that correspond to the repairs. Such a configuration may allow the computing system to better implement repairs by making it more likely for users to understand and accept repairs that may be provided by the computing system.

Embodiments of the present disclosure are explained with reference to the accompanying drawings.

Figure 1A:
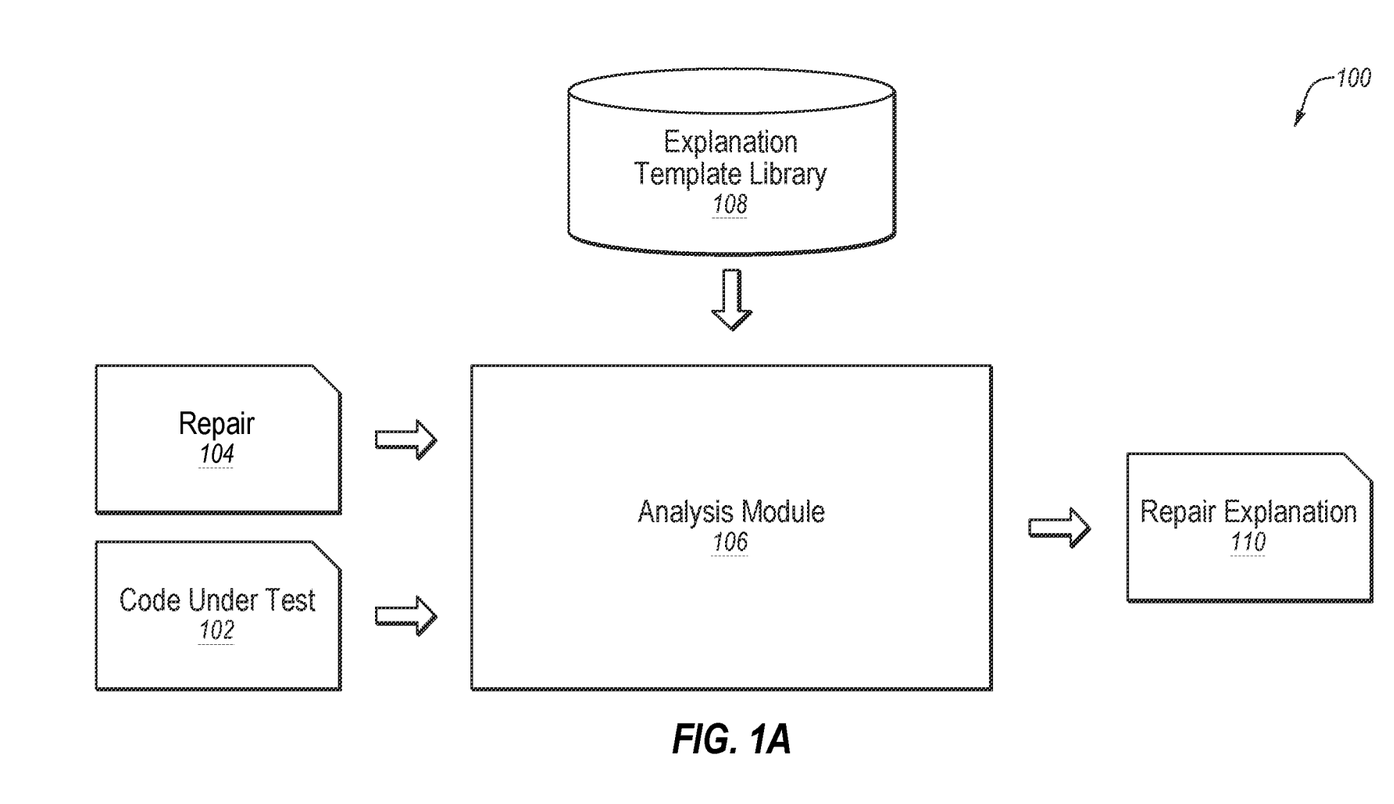
FIG. 1A is a diagram representing an example environment related to generating repair explanations.

FIG. 1A is a diagram representing an example environment 100 related to generating repair explanations, arranged in accordance with at least one embodiment described in the present disclosure. The environment 100 may include an analysis module 106 configured to generate a repair explanation 110 of a repair 104 of an error of code under test 102.

The code under test 102 may include electronic data, such as, for example, a software program, source code of the software program, libraries, applications, scripts, or other logic or instructions for execution by a processing device. In some embodiments, the code under test 102 may include a complete instance of the software program. Additionally or alternatively, the code under test 102 may include a portion of the software program. The code under test 102 may be written in any suitable type of computer language that may be used for the software program.

The code under test 102 may include one or more errors. The repair 104 may be provided as a patch or repair that may correct one or more of the errors. Additionally or alternatively, the repair 104 may include one or more edits that may be made to the code under test 102 to repair the code under test 102. The edits may include adding one or more elements to the code under test 102 (e.g., adding one or more lines of code, variables, objects, methods, etc.), removing one or more elements from the code under test 102 (e.g., removing one or more lines of code, variables, objects, methods, etc.), changing a name of an element (e.g., a variable name, a method name, an object name, etc.), or any other suitable edit to the code under test 102.

The analysis module 106 may include code and routines configured to enable a computing system to perform one or more operations. Additionally or alternatively, the analysis module 106 may be implemented using hardware including a processor, a microprocessor (e.g., to perform or control performance of one or more operations), a field-programmable gate array (FPGA), or an application-specific integrated circuit (ASIC). In some other instances, the analysis module 106 may be implemented using a combination of hardware and software. In the present disclosure, operations described as being performed by the analysis module 106 may include operations that the analysis module 106 may direct a corresponding system to perform. The analysis module 106 may be configured to perform a series of operations with respect to the code under test 102 and the repair 104 to generate the repair explanation 110 as described below.

The analysis module 106 may be configured to obtain the repair 104. In some embodiments, the analysis module 106 may be configured to obtain the repair 104 by performing one or more repair operations with respect to the code under test 102.

For example, in some embodiments, the analysis module 106 may be configured to perform one or more of the repair operations with respect to the code under test 102 based on one or more test suites. The test suites may include one or more routines that may operate as test cases for the code under test 102. The test suites may be configured to determine whether the code under test 102 behaves in a specified manner. The test suites may be configured and implemented according to any suitable technique.

The analysis module 106 may be configured to apply one or more of the test suites with respect to the code under test 102 to detect or determine one or more errors and corresponding error locations in the code under test 102. In some embodiments, the analysis module 106 may be configured to execute one or more tests included in the test suites, which may be referred to as performing a test execution. A test execution that passes may be referred to as a "passing test execution" and a test execution that fails may be referred to as a "failing test execution." In some embodiments, an error location and corresponding error of the code under test 102 may be identified based on a failing test execution executing code appearing at the error location.

In some embodiments, the analysis module 106 may be configured to obtain the repair 104 as a repair candidate for the identified error. In these or other embodiments, the analysis module 106 may obtain the repair 104 from a repair template as a potential modification that may be made to repair the detected error. The repairs of the repair template may be obtained or generated according to any suitable technique. For example, in some embodiments, the repairs of the repair template may be obtained based on repositories of already existing code such as described with respect to U.S. Pat. No. 10,733,075 filed on Aug. 22, 2018 and issued on Aug. 4, 2020, incorporated by reference herein in its entirety.

In these or other embodiments, the analysis module 106 may be configured to select the repair 104 from a set of potential repair candidates. The analysis module 106 may be configured to select the repair according to any suitable technique. For example, the analysis module 106 may be configured to select the repair 104 based on or from a repository of repair examples. In these or other embodiments, the repair 104 may be selected based on a prioritization of the repair 104 that may be determined according to any suitable technique. In these or other embodiments, the analysis module 106 may not perform the operations related to identifying and selecting the repair 104 and instead may merely obtain (e.g., receive) the repair 104 from another system and/or module.

In some embodiments, the analysis module 106 may be configured to generate the repair explanation 110 based on an explanation template library 108 ("explanation library 108"). The explanation library 108 may include explanation templates that may each correspond to a certain type of change that may be made to source code by an edit of a repair. The explanation templates may provide a natural language explanation that may provide extra details and explanation regarding the nature of the corresponding change type.

Figure 1B:
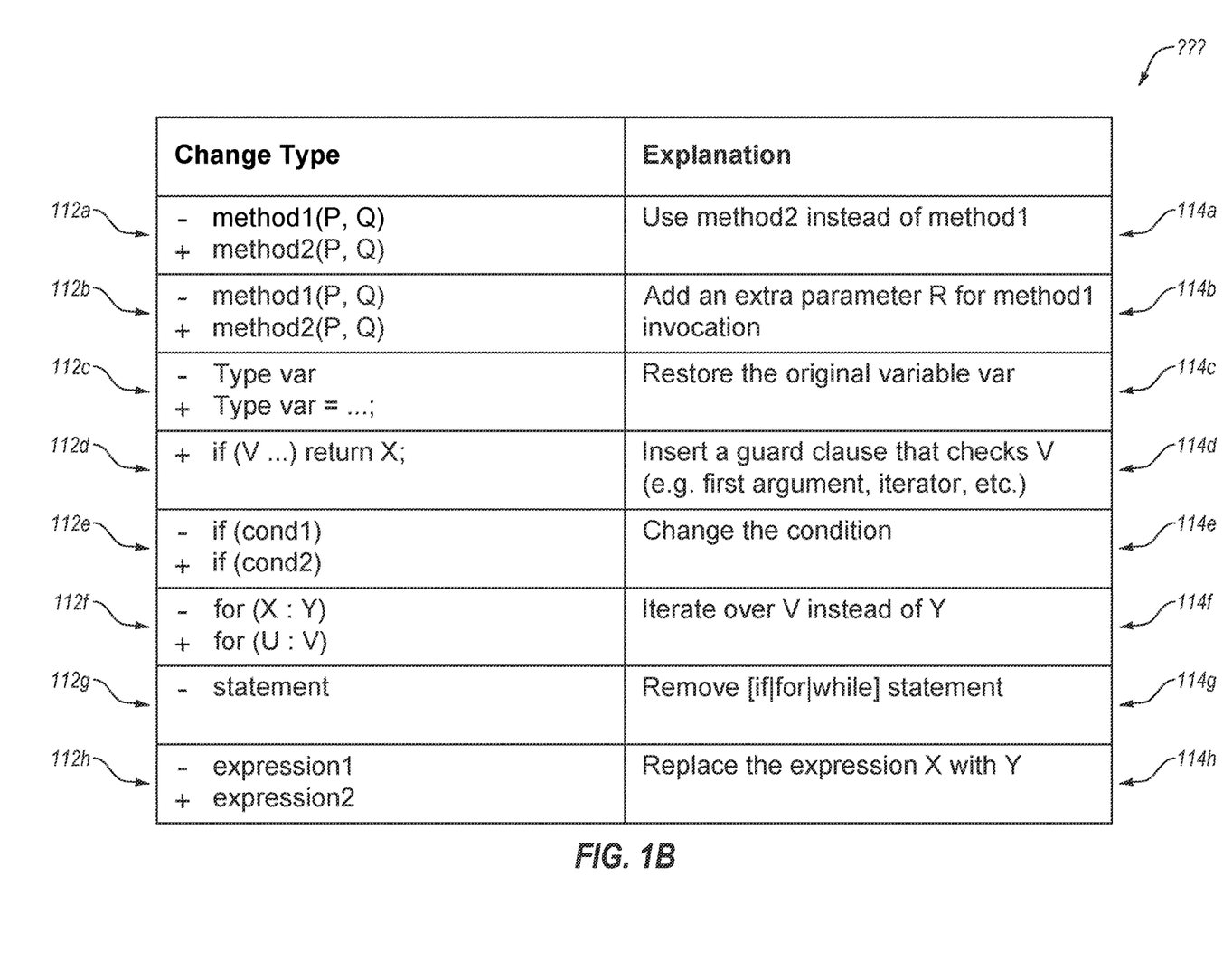
FIG. 1B illustrates an example explanation template library.

For example, FIG. 1B illustrates an example template explanation library 109 ("explanation library 109") that is an example of the explanation library 108 of FIG. 1A. The explanation library 109 includes a set of different change types 112 and corresponding explanation templates 114 that may provide a natural language explanation for the corresponding change types. For example, a change type 112a may include removing a "method1" and replacing it with a "method2". The explanation library 109 may include a corresponding explanation template 114a that may include placeholders for the methods of the change type 112a as well as natural language that explains the edits made with the change type 112a.

The explanation library 109 includes additional examples including: a change type 112b and a corresponding explanation template 114b related to adding a parameter to a method call; a change type 112c and a corresponding explanation template 114c related to restoring an original variable; a change type 112d and a corresponding explanation template 114d related to inserting a guard clause to check a variable; a change type 112e and a corresponding explanation template 114e related to inserting a guard clause to check a variable; a change type 112f and a corresponding explanation template 114f related to iterating over different variable types; a change type 112g and a corresponding explanation template 114g related to removing a statement; and a change type 112h and a corresponding explanation template 114h related to replacing an expression with another expression. In the example explanation library 109, a code element preceded with a minus sign "−" indicates that the edit of the corresponding change type 112 has removed the element and a code element preceded with a plus sign "+" indicates that the edit of the corresponding change type 112 has added the element. Further, the example explanation library 109 is not exhaustive and does not include every possible change type and corresponding explanation, but is merely meant as an example. Further, the language used for each explanation template 114 may vary from what is explicitly illustrated.

Returning to FIG. 1A, the analysis module 106 may be configured to determine the change type of one or more of the edits of the repair 104. For example, the analysis module 106 may parse the repair 104 and/or the code under test 102 to identify, as edits of the repair 104, changes that the repair 104 would make to the code under test 102. For instance the analysis module 106 may compare the repair 104 against the code under test 102 to identify the edits of the repair 104. Additionally or alternatively, in some embodiments, the repair 104 may indicate which edits are made and the analysis module 106 may determine which changes are made based on the indications.

Additionally, based on the comparison and/or the indications, the analysis module 106 may be configured to determine the change types of the different edits. For example, the analysis module 106 may be configured to identify which code elements are removed and/or added with respect to the corresponding edits. Additionally or alternatively, the analysis module 106 may be configured to determine the types of code elements involved in the edits.

In some embodiments, the analysis module 106 may be configured to determine the change types by comparing the changes made with respect to the edits against the different change types included in the explanation library 108. For example, with respect to the explanation library 109 of FIG. 1B, a particular edit may be identified as deleting a first method "A" at a particular location and adding a second method "B" at the particular location. The analysis module 106 may compare the particular edit against the edits that correspond with the different change types 112 and based on such a comparison may determine that the change type of the edit is the change type 112a, which relates to replacing the first method with the second method.

In these or other embodiments, the analysis module 106 may be configured to identify the explanation templates of the explanation library 108 that correspond to the identified change types of the one or more edits. For example, returning to the example explanation library 109 of FIG. 1B, the analysis module 106 may be configured to identify the explanation template 114a for the particular edit with the change type 112a based on the explanation template 114a corresponding to the change type 112a.

Additionally or alternatively, the analysis module 106 may be configured to generate a change explanation for each of the edits for which a change type is determined. The change explanation for a respective edit may be generated based on the explanation template identified for the respective edit. For example, returning to the explanation library 109 of FIG. 1B, for the particular edit of the change type 112a, a particular change explanation may be generated based on the explanation template 114a. For instance, the placeholders for the method names in the explanation template 114a may be replaced with the first method name "A" and the second method name "B" to generate the particular change explanation for the particular edit.

In some embodiments, the analysis module 106 may be configured to generate change explanations for a subset of the edits of the repair 104. For example, in some embodiments, the analysis module 106 may be configured to generate change explanations for edits that are designated as functional edits but not for edits that are designated as non-functional edits.

In some embodiments, the analysis module 106 may designate edits as functional edits in response to the edits making a functional change to the code under test 102 that may be needed to repair the error. For example, functional changes may include any change that may substantively change the functionality or operations of the code under test 102. Additionally or alternatively, the analysis module 106 may designate edits as non-functional edits in response to the edits being not changing functionality of the code under test 102. For example, a secondary edit may include making a stylistic change to the code under test 102, such as changing a name or type of a particular variable or some other code element Additionally, or alternatively, an edit that is a repeat of an edit that corrects the error at its original source but that is later in the code due to propagation of the original error may be designated as a repeat edit.

In some embodiments, the analysis module 106 may be configured to generate a repair explanation 110 for the repair 104 based on the generated change explanations. For example, in some embodiments, the analysis module 106 may be configured to include each of the change explanations in the repair explanation 110. For instance, the analysis module 106 may be configured to combine the change explanations to generate the repair explanation 110. In these or other embodiments, the analysis module 106 may be configured to concatenate the change explanations to generate the repair explanation 110.

In some embodiments, and as indicated above, the analysis module 106 may be configured to generate change explanations and/or include change explanations in the repair explanation 110 based on edit type designations of the corresponding edits. For example, in some embodiments, an edit may be designated as a functional edit, a non-functional edit, or a repeat edit, such as described above. Additionally or alternatively, an edit may be designated as a primary edit or a secondary edit. In these or other embodiments, edits may include multiple designations. For example, a particular edit may be designated as being a functional edit and a primary edit, as being a functional edit and a secondary edit, as being a non-functional edit and a primary edit, or as being a non-functional edit and a secondary edit.

Primary edits may include edits that contribute to or are specifically related to correcting the error. In some embodiments, primary edits may correspond to the error location of the error. For example, primary edits may include edits made at the error location of the error. Additionally or alternatively, primary edits may include edits from which a primary edit made at the error location depends. For example, a first primary edit made at the error location may depend from a second primary edit made at a different location of the code under test 102. Due to the first primary edit being made at the error location but also depending on the second primary edit, the second primary edit may also be designated as a primary edit.

Secondary edits may include edits that may not be deemed as primary edits. For example, secondary edits may include edits that do not contribute to correction of the error.

In some embodiments, the analysis module 106 may be configured to identify one or more primary and/or secondary edits by generating an edit causal graph based on the repair 104 and the code under test 102. Additionally or alternatively, the analysis module 106 may be configured to identify one or more edit type designations according to one or more operations described below with respect to FIGS. 4A-4C.

In some embodiments, the analysis module 106 may be configured to include in the repair explanation 110 change explanations that correspond to functional edits (e.g., both primary and secondary edits that are also functional edits) but may omit from the repair explanation 110 change explanations that correspond to non-functional edits and/or repeat edits. Additionally or alternatively, the analysis module 106 may be configured to include in the repair explanation 110 change explanations that correspond to primary edits but may omit from the repair explanation 110 change explanations that correspond to secondary edits. In these or other embodiments, the analysis module 106 may be configured to include all change explanations in the repair explanation 110.

In some embodiments, the analysis module 106 may be configured to order the change explanations in the repair explanation 110 based on the edit type designations of the edits that correspond to the included change explanations. For example, in some embodiments, change explanations that correspond to the primary edits may be ordered in the repair explanation ahead of change explanations that correspond to the secondary edits.

In some embodiments, the explanation library 108 may also include one or more introduction templates for explaining to which error the repair explanation 110 relates. In these or other embodiments, the analysis module 106 may be configured to use an introduction template to generate an introduction clause of the repair explanation 110 that explains to which error the repair explanation 110 relates. An example repair explanation is given with respect to FIG. 1D that provides an example introduction clause.

Additionally or alternatively, the explanation library 108 may include one or more transition templates that may be used to differentiate between change explanations that correspond to primary edits and change explanations that correspond to secondary edits. In these or other embodiments, the analysis module 106 may be configured to use a transition template to generate a transition clause of the repair explanation 110. The example repair explanation of FIG. 1D provides an example transition clause.

Therefore, according to the above-description, the analysis module 106 may be configured to generate the repair explanation 110 for the repair 104. The repair explanation 110 may provide more and/or better information about the repair 104 than a general list of edits made by the repair 104.

Figure 1C:
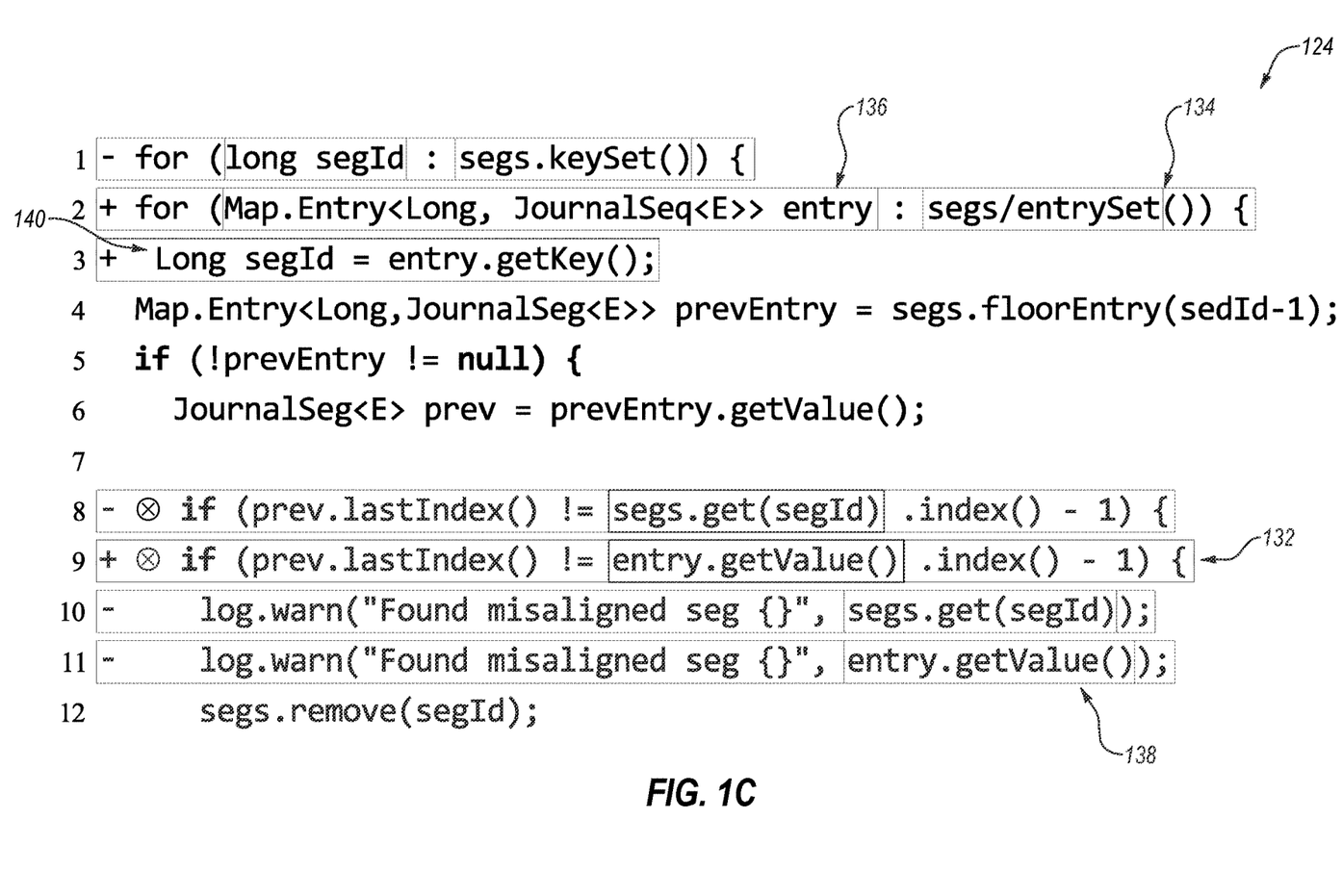
FIG. 1C illustrates source code of an example repair.
Figure 1D:
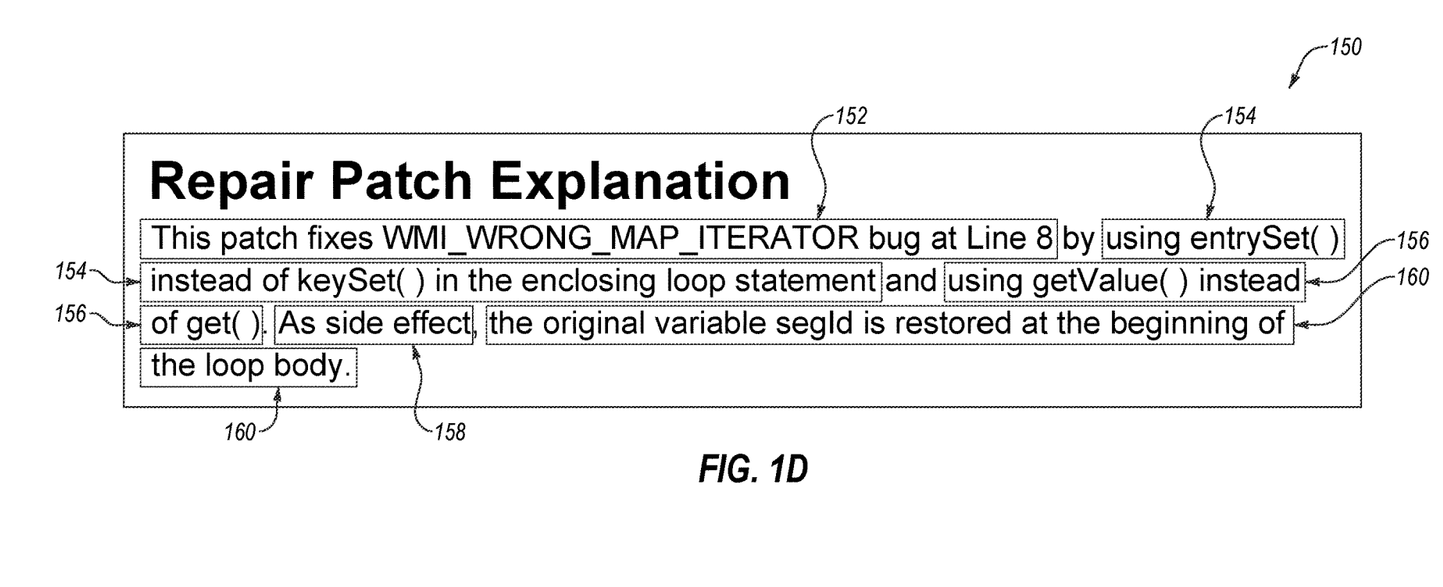
FIG. 1D illustrates an example explanation of the example repair of FIG. 1C

FIG. 1C illustrates an example repair 124, which may be an example of the repair 104 of FIG. 1A. The repair 124 may include a first edit 132, a second edit 134, a third edit 136, a fourth edit 138, and a fifth edit 140. The repair 124 may relate to repairing an error at line 8 of corresponding code under test in which the wrong iterator method was used in the corresponding code.

The first edit 132 may include removing the line of code indicated at line "8" of the repair 124 and adding the line of code indicated at line "9" of the repair 124. The first edit 132 may result in replacing the method "get( )" with the method "getValue( )" and may be at the error location. Further, the first edit 132 may introduce the correct iterator method to correct the error and accordingly may be designated as a functional edit and a primary edit.

The second edit 134 may include removing the line of code indicated at line "1" of the repair 124 and adding the line of code indicated at line "2" of the repair 124. The second edit 134 may result in replacing the method "keySet( )" with the method "entrySet( )". Further, the first edit 132 may depend on the second edit 134 through use of values provided by "entrySet( )" by the first edit 132. In some embodiments, the second edit 134 may be designated as a functional edit and a primary edit based on it making a functional change and based on the first edit 132 (which is at the error location) depending on the second edit 134.

The third edit 136 may define a new iterator "entry" that is used by the method "entrySet( )" added by the second edit 134. The third edit 136 may be designated as a functional edit and a secondary edit because it may not directly relate to correcting the error but may add functionality.

The fourth edit 138 may essentially be the same as the first edit 132 in that the fourth edit 138 may make the same method replacement as the first edit 132. The fourth edit 138 however may correct that original error at a different location in the code where the original error was propagated. Given that the fourth edit 138 is essentially a repeat of the first edit 132, the fourth edit 138 may be designated as a repeat edit.

The fifth edit 140 may add a new line of code that restores an iterator "segId", which was deleted by the second edit 134 through the removal of the line of code at line "1". The fifth edit 140 may accordingly not directly relate to correction of the error, but may be related to restoring a certain functionality of the code that was removed by the second edit 134. Therefore, the fifth edit 140 may be designated as a secondary edit and a functional edit.

FIG. 1D illustrates an example repair explanation 150, which may be an example of the repair explanation 110 of FIG. 1A. The repair explanation 150 may be an example repair explanation of the repair 124 of FIG. 1C. The repair explanation 150 may be generated by the analysis module 106 according to one or more operations described in the present disclosure.

The repair explanation 150 may include an introduction clause 152 that may explain the error to which the repair 124 relates. The repair explanation 150 may include a change explanation 154 that explains the second edit 134 and may include a change explanation 156 that explains the first edit 132. Additionally or alternatively, the repair explanation 150 may include a transition clause 158 related to transitioning from explaining primary edits to explaining secondary edits. In these or other embodiments, the repair explanation 150 may include a change explanation 160 that explains the fifth edit 140. In the present example, the repair explanation 150 may omit change explanations for the third edit 136 and the fourth edit 138 in response to the third edit 136 and the fourth edit 138 being respectively designated as non-functional and repeat edits.

Modifications, additions, or omissions may be made to FIGS. 1A-1D without departing from the scope of the present disclosure. For example, additional or fewer operations may be performed than those explicitly described. Further, the examples as to which change explanations to generate for which edits and/or which change explanations may be included in the repair explanations may vary. Further, the actual language used in the repair explanations and/or change explanations may vary from the examples given.

Figure 2:
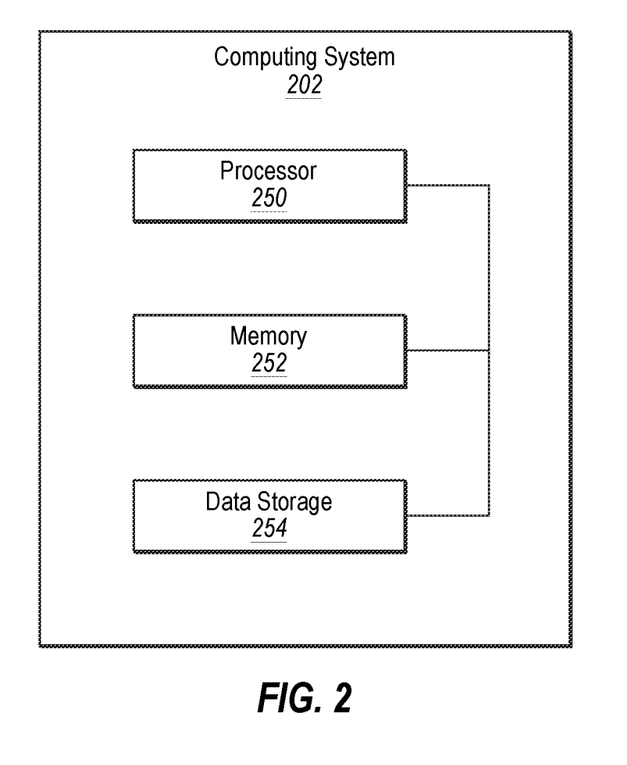
FIG. 2 illustrates a block diagram of an example computing system.

FIG. 2 illustrates a block diagram of an example computing system 202, according to at least one embodiment of the present disclosure. The computing system 202 may be configured to implement or direct one or more operations associated with an analysis module (e.g., the analysis module 106 of FIG. 1A). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the above mentioned analysis module (e.g., the analysis module 106 of FIG. 1A) may be included in the data storage 254 as program instructions. The processor 250 may fetch the program instructions of the analysis module from the data storage 254 and may load the program instructions of the analysis module in the memory 252. After the program instructions of the analysis module are loaded into memory 252, the processor 250 may execute the program instructions such that the computing system may implement the operations associated with the analysis module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
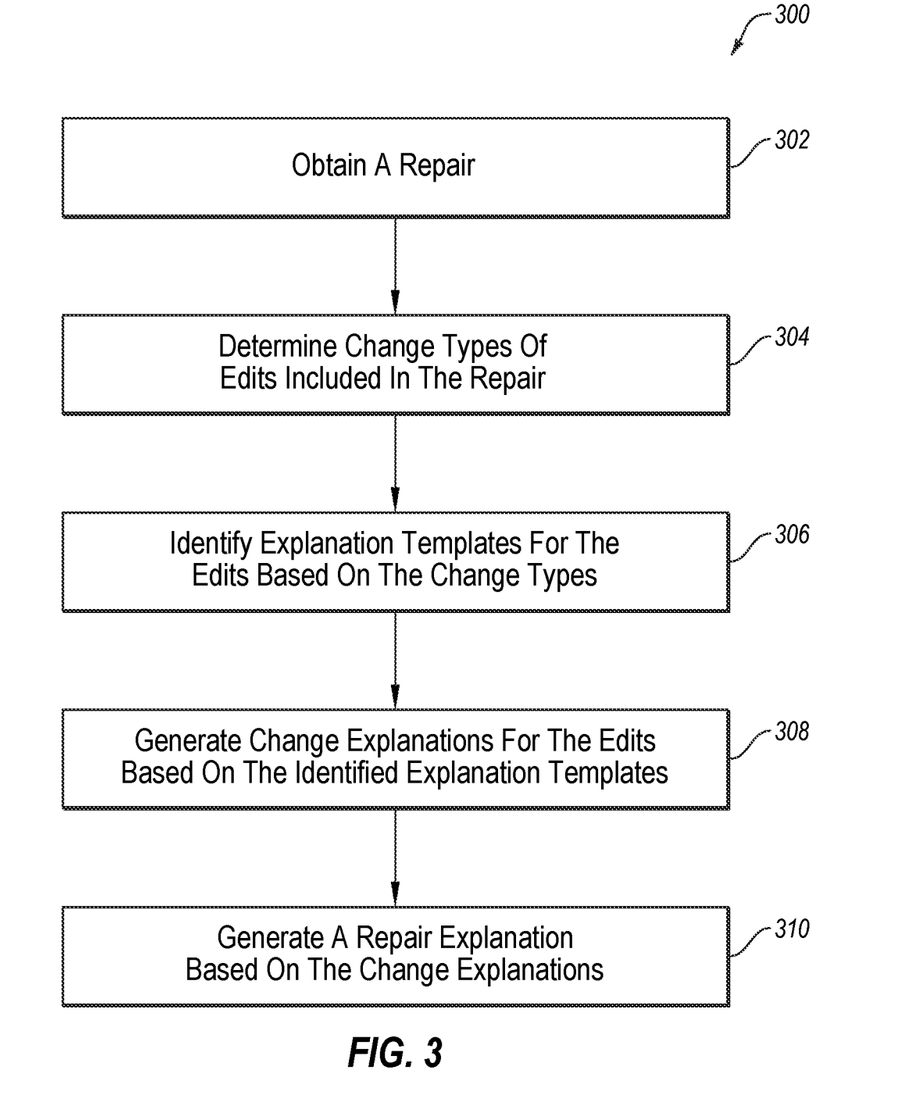
FIG. 3 is a flowchart of an example method of generating a repair explanation.

FIG. 3 is a flowchart of an example method 300 of generating a repair explanation, according to at least one embodiment described in the present disclosure. The method 300 may be performed by any suitable system, apparatus, or device. For example, the analysis module 106 of FIG. 1A or the computing system 202 of FIG. 2 (e.g., as directed by the analysis module) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, at which a repair may be obtained. For example, the repair 104 of FIG. 1A may be obtained. In some embodiments, the repair may be obtained such as described above with respect to FIGS. 1A-1D.

At block 304, the change types of one or more of the edits included in the repair may be determined. For example, in some embodiments, the change types may be determined such as described above with respect to FIGS. 1A-1D.

Further, in some embodiments, the edit type designations may be determined for the edits and the change types may be determined for edits of certain edit type designations. For example, in some embodiments, change types may be determined for functional edits but not for non-functional edits. In some embodiments, the determination as to whether an edit is a functional edit or a non-functional edit may be based on the effect of the edit on the code, such as described above. Additionally or alternatively, the identification of primary edits based on dependency between edits such as described above may be made according to one or more operations described with respect to FIGS. 4A-4C, described in further detail below.

At block 306, explanation templates may be identified for the edits for which a corresponding change type was determined at block 304. For example, in some embodiments, the explanation templates may be identified from a library of explanation templates, such as described above with respect to FIGS. 1A-1D.

At block 308, change explanations may be generated for the edits for which a corresponding change type was determined. The change explanations may be generated based on the corresponding explanation templates identified at block 306 for the respective edits. For example, in some embodiments, the change explanations may be generated such as described above with respect to FIGS. 1A-1D.

At block 310, a repair explanation for the repair may be generated based on the generated change explanations. For example, in some embodiments, the repair explanation may be generated such as described above with respect to FIGS. 1A-1D.

Modifications, additions, or omissions may be made to the method 300 without departing from the scope of the present disclosure. For example some of the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 4A:
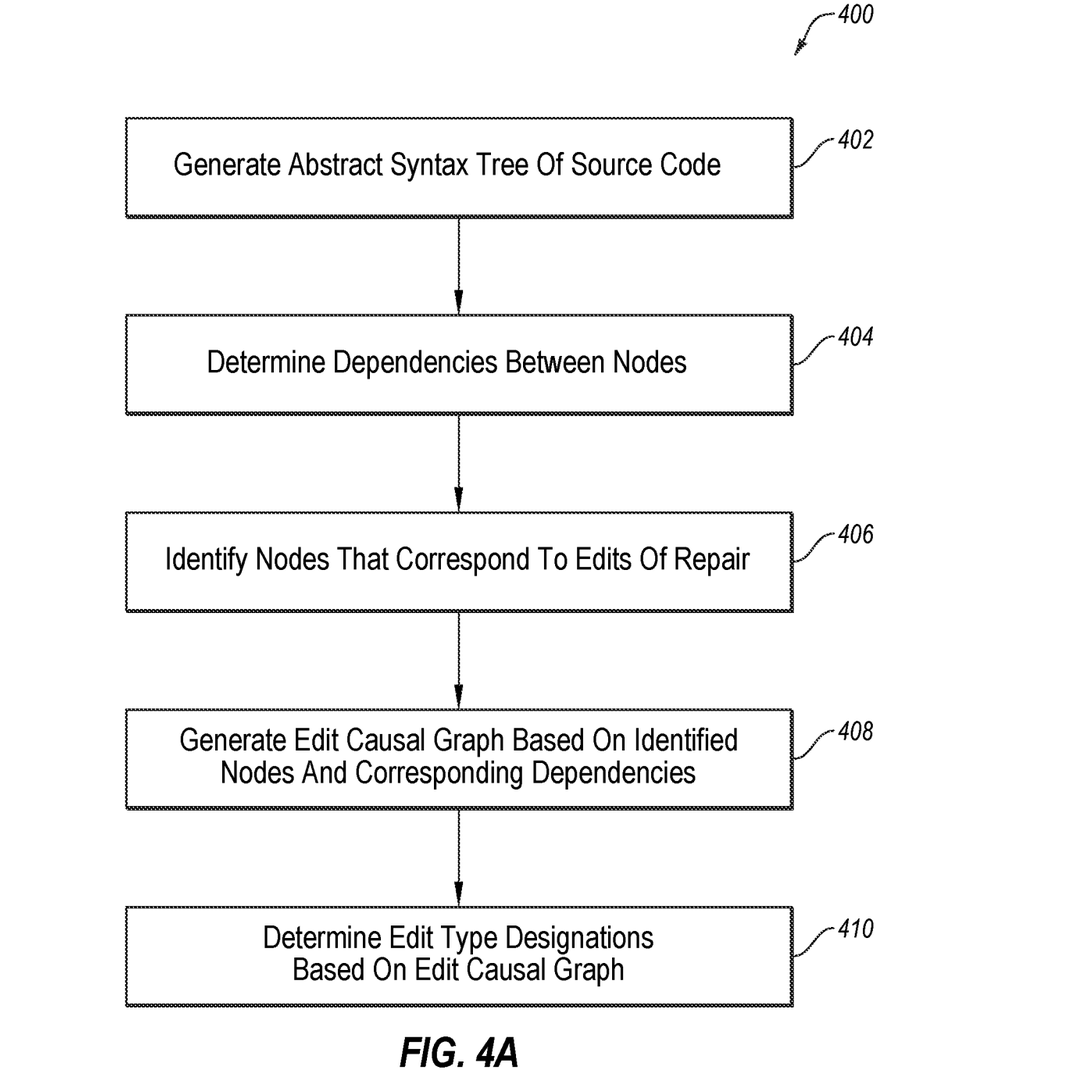
FIG. 4A is a flowchart of an example method of determining edit type designations of edits of a repair.

FIG. 4A is a flowchart of an example method 400 of determining one or more edit type designations, according to at least one embodiment described in the present disclosure. The method 400 may be performed by any suitable system, apparatus, or device. For example, the analysis module 106 of FIG. 1A or the computing system 202 of FIG. 2 (e.g., as directed by the analysis module) may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

In general, the method 400 may relate to identifying primary edits of a repair of an error identified from source code. More particularly, the method 400 may include operations related to generation of a causal graph, which may be used to identify primary edits that may not be located at the error location, but which may be edits from which a primary edit made at the error location may depend.

The method 400 may begin at block 402, at which an abstract syntax tree (AST) of source code that includes the error may be generated. In some embodiments, the AST may be of all of the source code. Additionally or alternatively, the AST may be of a portion of the source code that includes the error. The AST may include nodes that correspond to elements of the source code and edges that indicate relationships between the elements. The AST may be generated according to any suitable technique.

At block 404, dependencies between nodes of the AST may be determined. Dependencies may indicate that a change to one or more elements of one node may affect another node of the AST. In some embodiments, the dependencies may be determined based on a static analysis of the source code according to any suitable technique.

At block 406, nodes of the AST that correspond to edits included in the repair may be identified as repair nodes. For example, nodes where an edit of the repair changes one or more elements of the corresponding node may be identified as repair nodes. Additionally or alternatively, in some instances more than one node of the AST may correspond to a same edit. All the repair nodes that correspond to a same edit may be referred to as a particular repair node set. A repair node set may thus include one or more repair nodes.

At block 408, an edit causal graph may be generated based on the identified repair nodes and based on dependencies that correspond to the repair nodes. For example, the edit causal graph may include nodes that correspond to the repair nodes and relationships between the causal graph nodes may be based on dependencies associated with the repair nodes.

Figure 4B:
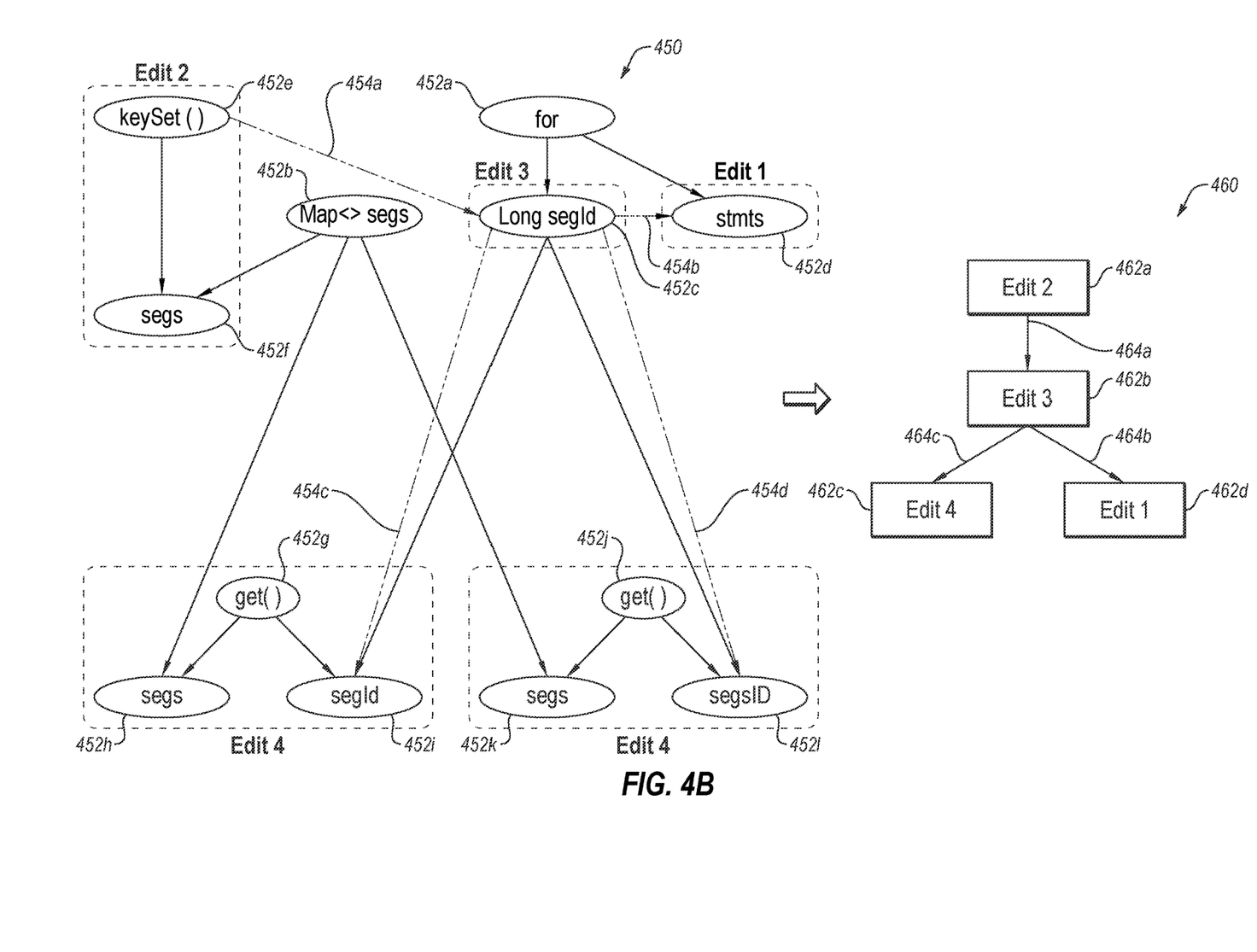
FIG. 4B illustrates an example generation of an edit causal graph.

FIG. 4B illustrates an example edit causal graph 460 that may be generated based on an example AST 450 according to one or more of the operations described above with respect to blocks 402, 404, 406, and 408. For example, at block 402, the AST 450 may be generated. The AST 450 may include multiple nodes 452, which are illustrated as nodes 452a-452l in FIG. 4B. The nodes 452 may represent elements of source code. The AST 450 may also include edges (not explicitly enumerated but indicated with solid lines) that may indicate relationships between the nodes 452.

Further, dependencies between the nodes 452 may be determined as described above with respect to block 404. The dependencies are indicated by dotted line edges 454, which are illustrated as edges 454a-454d.

In addition, repair nodes of the nodes 452 may be identified such as described above with respect to block 406. For example, node 452d may include elements that correspond to a first edit ("Edit 1") of the corresponding repair, nodes 452e and 452f may include elements that correspond to a second edit ("Edit 2") of the corresponding repair, node 452c may include elements that correspond to a third edit ("Edit 3") of the corresponding repair, and nodes 452g-452i and nodes 452j-452l respectively may include elements that correspond to two different instances of a fourth edit ("Edit 4") of the corresponding repair. Accordingly, node 452d may be designated as a first repair node set, nodes 452e and 452f may be designated as a second repair node set, node 452c may be designated as a third repair node set, and nodes 452g-452l may be designated as a fourth repair node set.

The edit causal graph 460 may be generated based on the repair node sets and the corresponding dependencies. For example, the edit causal graph may include: a causal graph node 462a that corresponds to Edit 2; a causal graph node 462b that corresponds to the Edit 3, a causal graph node 462c that corresponds to Edit 4, and a causal graph node 462d that corresponds to Edit 1.

In addition, as indicated by the dependency edge 454a of the AST 450, the node 452c of the third repair node set of Edit 3 may depend from the node 452e of the second repair node set of Edit 2. Therefore, the causal graph node 462b may be deemed a child node of the causal graph node 462a, which is indicated by a dependency edge 464a of the causal graph 460.

As another example, as indicated by the dependency edge 454b of the AST 450, the node 452d of the first repair node set of Edit 1 may depend from the node 452c of the third repair node set of Edit 3. Therefore, the causal graph node 462d may be deemed a child node of the causal graph node 462b, which is indicated by a dependency edge 464b of the causal graph 460. In addition, as indicated by the dependency edges 454c and 454d of the AST 450, the nodes 452i and 452l, respectively, of the fourth repair node set of Edit 4 may depend from the node 452c of the third repair node set of Edit 3. Therefore, the causal graph node 462c may be deemed a child node of the causal graph node 462b, which is indicated by a dependency edge 464c of the causal graph 460.

Returning to FIG. 4A, at block 410 one or more edit type designations may be determined based on the edit causal graph generated at block 408. For example, primary edits and/or secondary edits may be determined from the edit causal graph. For instance, the node of the edit causal graph that corresponds to an edit made at the error location may be identified. The edit that corresponds to this node may be designated as a primary edit. In these or other embodiments, the parent nodes of the node that corresponds to the error location may also be designated as primary edits. In addition, edits that correspond to causal graph nodes that are not parent nodes of the node that corresponds to the error location may be designated as secondary edits.

For example, referring to the edit causal graph 460 of FIG. 4B, Edit 4 may be an edit at the error location of the error. Therefor, Edit 4 may be designated as a primary edit. Additionally, nodes 462b and 462a that correspond to Edit 3 and Edit 2, respectively, may be parent nodes of node 462c that corresponds to Edit 4. Therefore, Edit 2 and Edit 3 may also be designated as primary edits. In addition, node 462d may not be a parent node of node 462c such that Edit 1 may be designated as a secondary edit.

Returning to FIG. 4A, in some embodiments, block 410 may also include determining whether the identified primary and/or secondary edits are functional edits or non-functional edits. The determination as to whether they are functional edits or non-functional edits may be according to the related description given above with respect to FIGS. 1A-1D.

Modifications, additions, or omissions may be made to the method 400 without departing from the scope of the present disclosure. For example some of the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. This interpretation of the phrase "A or B" is still applicable even though the term "A and/or B" may be used at times to include the possibilities of "A" or "B" or "A and B."

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
obtaining a repair related to correcting an error of source code of a software program, the repair including a first edit to make to the source code;
determining a first change type of the first edit;
identifying a first explanation template from a library of explanation templates based on the first change type corresponding to the first explanation template in the library of explanation templates, the first explanation template providing a natural language explanation that explains the first change type; and
generating a first change explanation for the first edit based on the first explanation template, the first change explanation providing the natural language explanation with respect to changes made by the first edit, the generating of the first change explanation including replacing placeholder terms in the first explanation template with terms included in the source code.

2. The method of claim 1, wherein the repair includes a second edit to make to the source code and wherein the method further comprises:
determining a second change type of the second edit;
identifying a second explanation template from the library of explanation templates based on the second change type corresponding to the second explanation template in the library of explanation templates;
generating a second change explanation for the second edit based on the second explanation template, the second change explanation explaining the changes made by the second edit; and
generating a repair explanation based on the first change explanation and the second change explanation.

3. The method of claim 2, wherein generating the repair explanation includes combining the first change explanation with the second change explanation.

4. The method of claim 2, further comprising omitting generation of a third change explanation of a third edit of the repair in response to the third edit being determined as being a non-functional edit.

5. The method of claim 1, wherein generating the first change explanation is in response to the first edit corresponding to a functional change in the source code.

6. The method of claim 1, wherein the first change explanation is generated in response to the first edit being with respect to an error location of the error of the source code.

7. The method of claim 1, further comprising determining that a second edit of the repair, which is with respect to an error location of the error, is dependent on the first edit, wherein the first change explanation is generated in response to the second edit being with respect to the error location and in response to the second edit being dependent on the first edit.

8. The method of claim 7, further comprising generating an edit causal graph based on an abstract syntax tree (AST) of the source code and determined dependencies between nodes of the AST that correspond to edits of the repair, wherein determining that the second edit is dependent on the first edit is based on the edit causal graph.

9. One or more non-transitory computer-readable storage media configured to store instructions that, in response to being executed, cause a system to perform operations, the operations comprising:
- obtaining a repair related to correcting an error of source code of a software program, the repair including a first edit to make to the source code;
- determining a first particular change type of the first edit;
- accessing a library of explanation templates that includes a respective natural language explanation corresponding to each of one or more change types of changes that could be possibly made to software programs, the library of explanation templates including one or more of:
  - a first change type and a corresponding first explanation template related to replacing a method call with another method call;
  - a second change type and a corresponding second explanation template related to changing one or more method call parameters;
  - a third change type and a corresponding third explanation template related to restoring an original variable;
  - a fourth change type and a corresponding fourth explanation template related to inserting a guard clause;
  - a fifth change type and a corresponding fifth explanation template related to iterating over different variable types;
  - a sixth change type and a corresponding sixth explanation template related to removing a statement; or
  - a seventh change type and a corresponding seventh explanation template related to replacing an expression with another expression,
- identifying a first particular explanation template from the library of explanation templates based on the first particular change type corresponding to the first particular explanation template in the library of explanation templates; and
- generating a first change explanation for the first edit based on the first particular explanation template, the first change explanation providing a natural language explanation of the changes made by the first edit.

10. The one or more non-transitory computer-readable storage media of claim 9, wherein the repair includes a second edit to make to the source code and wherein the operations further comprise:
- determining a second particular change type of the second edit;
- identifying a second particular explanation template from the library of explanation templates based on the second particular change type corresponding to the second particular explanation template in the library of explanation templates;
- generating a second change explanation for the second edit based on the second particular explanation template, the second change explanation explaining the changes made by the second edit; and
- generating a repair explanation based on the first change explanation and the second change explanation.

11. The one or more non-transitory computer-readable storage media of claim 10, wherein the operations further comprise omitting generation of a third change explanation of a third edit of the repair in response to the third edit being determined as being a non-functional edit.

12. The one or more non-transitory computer-readable storage media of claim 9, wherein generating the first change explanation is in response to the first edit corresponding to a functional change in the source code.

13. The one or more non-transitory computer-readable storage media of claim 9, wherein the first change explanation is generated in response to the first edit being with respect to an error location of the error of the source code.

14. The one or more non-transitory computer-readable storage media of claim 9, wherein the operations further comprise determining that a second edit of the repair, which is with respect to an error location of the error, is dependent on the first edit, wherein the first change explanation is generated in response to the second edit being with respect to the error location and in response to the second edit being dependent on the first edit.

15. The one or more non-transitory computer-readable storage media of claim 14, wherein the operations further comprise generating an edit causal graph based on an abstract syntax tree (AST) of the source code and determined dependencies between nodes of the AST that correspond to edits of the repair, wherein determining that the second edit is dependent on the first edit is based on the edit causal graph.

16. A system comprising:
- one or more processors; and
- one or more non-transitory computer-readable storage media configured to store instructions that, in response to being executed by the one or more processors, cause the system to perform operations, the operations comprising:
  - obtaining a repair related to correcting an error of source code of a software program, the repair including a first edit to make to the source code;
  - determining a first change type of the first edit;
  - accessing a library of explanation templates that includes a respective natural language explanation corresponding to each of one or more change types of changes that could be possibly made to software programs;
  - identifying a first explanation template from the library of explanation templates based on the first change type corresponding to the first explanation template in the library of explanation templates; and
  - generating a first change explanation for the first edit based on the first explanation template, the first change explanation providing a natural language explanation of the changes made by the first edit, the generating of the first change explanation including replacing placeholder terms in the first explanation template with terms included in the source code.

17. The system of claim 16, wherein the repair includes a second edit to make to the source code and wherein the operations further comprise:
- determining a second change type of the second edit;
- identifying a second explanation template from the library of explanation templates based on the second change type corresponding to the second explanation template in the library of explanation templates;
- generating a second change explanation for the second edit based on the second explanation template, the second change explanation explaining the changes made by the second edit; and
- generating a repair explanation based on the first change explanation and the second change explanation.

18. The system of claim 16, wherein the operations further comprise omitting generation of a third change explanation of a third edit of the repair in response to the third edit being determined as being a non-functional edit.

19. The system of claim 16, wherein generating the first change explanation is in response to one or more of:
   the first edit corresponding to a functional change in the source code; or
   the first edit being with respect to an error location of the error of the source code.

20. The system of claim 16, wherein the operations further comprise determining that a second edit of the repair, which is with respect to an error location of the error, is dependent on the first edit, wherein the first change explanation is generated in response to the second edit being with respect to the error location and in response to the second edit being dependent on the first edit.

\* \* \* \* \*